(12) United States Patent
Yamazaki

(10) Patent No.: US 11,623,410 B2
(45) Date of Patent: Apr. 11, 2023

(54) THREE-DIMENSIONAL SHAPED OBJECT MANUFACTURING METHOD AND INFORMATION PROCESSING DEVICE

(71) Applicant: SEIKO EPSON CORPORATION, Tokyo (JP)

(72) Inventor: Satoshi Yamazaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 82 days.

(21) Appl. No.: 17/160,026

(22) Filed: Jan. 27, 2021

(65) Prior Publication Data
US 2021/0237362 A1 Aug. 5, 2021

(30) Foreign Application Priority Data
Jan. 30, 2020 (JP) .............................. JP2020-013572

(51) Int. Cl.
*B29C 64/393* (2017.01)
*B33Y 10/00* (2015.01)
*B33Y 50/02* (2015.01)
*G05B 19/4099* (2006.01)
*B29C 64/118* (2017.01)
(Continued)

(52) U.S. Cl.
CPC .......... *B29C 64/393* (2017.08); *B29C 64/118* (2017.08); *B33Y 10/00* (2014.12); *B33Y 50/02* (2014.12); *G05B 19/4099* (2013.01); *B29K 2101/12* (2013.01); *B33Y 50/00* (2014.12); *G05B 2219/35134* (2013.01); *G05B 2219/49023* (2013.01)

(58) Field of Classification Search
CPC ..... B29C 64/393; B29C 64/118; B33Y 10/00; B33Y 50/02; B33Y 50/00; B29K 2101/12; G05B 19/4099; G05B 2219/35134; G05B 2219/49023

USPC ......................................................... 264/308
See application file for complete search history.

(56) References Cited

U.S. PATENT DOCUMENTS

2007/0179657 A1\* 8/2007 Holzwarth ............ B29C 64/106
700/187
2018/0264742 A1\* 9/2018 Yang ..................... B29C 64/118

FOREIGN PATENT DOCUMENTS

JP 2009-525207 7/2009
WO 2015-046217 4/2015

\* cited by examiner

*Primary Examiner* — Joseph S Del Sole
*Assistant Examiner* — Lawrence D. Hohenbrink, Jr.
(74) *Attorney, Agent, or Firm* — Workman Nydegger

(57) ABSTRACT

A three-dimensional shaped object manufacturing method includes a first step of acquiring shape data corresponding to a three-dimensional shaped object, a second step of generating, using the shape data, first intermediate data including path information indicating a path along which a depositing unit moves while depositing a shaping material and depositing amount information indicating a depositing amount of the shaping material, a third step of generating second intermediate data by changing the first intermediate data to increase an amount of the shaping material deposited and specifying a gap region interposed between regions where the shaping material is deposited according to the second intermediate data, a fourth step of generating shaping data by changing the first intermediate data or the second intermediate data such that the shaping material is deposited in the specified gap region, and a fifth step of shaping the three-dimensional shaped object according to the shaping data.

8 Claims, 12 Drawing Sheets

(51) Int. Cl.
*B29K 101/12* (2006.01)
*B33Y 50/00* (2015.01)

THREE-DIMENSIONAL SHAPED OBJECT MANUFACTURING METHOD AND INFORMATION PROCESSING DEVICE

The present application is based on, and claims priority from JP Application Serial Number 2020-013572, filed Jan. 30, 2020, the disclosure of which is hereby incorporated by reference herein in its entirety.

BACKGROUND

1. Technical Field

The present disclosure relates to a three-dimensional shaped object manufacturing method and an information processing device.

2. Related Art

Regarding a three-dimensional shaped object manufacturing method, for example, JP-T-2009-525207 discloses a technique for moving a nozzle that extrudes a shaping material in accordance with a build path for building layers of a three-dimensional shaped object. The build path includes a perimeter path, a bulk raster path, and a remnant path. The perimeter path is a path for forming a boundary between the three-dimensional shaped object and the outside. The bulk raster path is a path that fills a region surrounded by the perimeter path. The remnant path is a path that fills a void region that is not filled with the perimeter path and the bulk raster path.

According to the technique described above, a void ratio in the three-dimensional shaped object can be reduced by filling the void region with the remnant path. However, for example, a remnant path may also be added in a void region that does not need to be filled, such as a void region that is negligibly small. Therefore, there is a possibility that a time of a processing for filling the void region may be extended.

SUMMARY

According to a first aspect of the present disclosure, there is provided a three-dimensional shaped object manufacturing method for manufacturing a three-dimensional shaped object by discharging a shaping material from a discharge unit toward a stage to stack layers. The three-dimensional shaped object manufacturing method includes a first step of acquiring shape data indicating a three-dimensional shape of the three-dimensional shaped object, a second step of generating, using the acquired shape data, first intermediate data including path information indicating a path along which the discharge unit moves while discharging the shaping material and discharge amount information indicating a discharge amount of the shaping material in the path, a third step of generating second intermediate data by changing the first intermediate data such that an amount of the shaping material deposited according to the second intermediate data is larger than an amount of the shaping material deposited according to the first intermediate data and specifying a gap region interposed between regions where the shaping material is deposited according to the second intermediate data, a fourth step of generating shaping data by changing the first intermediate data or the second intermediate data such that the shaping material is deposited in the specified gap region, and a fifth step of shaping the three-dimensional shaped object according to the shaping data.

According to a second aspect of the present disclosure, there is provided an information processing device that generates shaping data for shaping a three-dimensional shaped object by discharging a shaping material from a discharge unit toward a stage to stack layers. The information processing device includes a data generation unit that generates the shaping data using shape data indicating a three-dimensional shape of the three-dimensional shaped object. The data generation unit generates, by using the shape data, first intermediate data including path information indicating a path along which the discharge unit moves while discharging the shaping material and discharge amount information indicating a discharge amount of the shaping material in the path, generates second intermediate data by changing the first intermediate data such that an amount of the shaping material deposited according to the second intermediate data is larger than an amount of the shaping material deposited according to the first intermediate data and specifies a gap region interposed between regions where the shaping material is deposited according to the second intermediate data, and generates the shaping data by changing the first intermediate data or the second intermediate data such that the shaping material is deposited in the specified gap region.

DESCRIPTION OF EXEMPLARY EMBODIMENTS

A. First Embodiment

Figure 1:
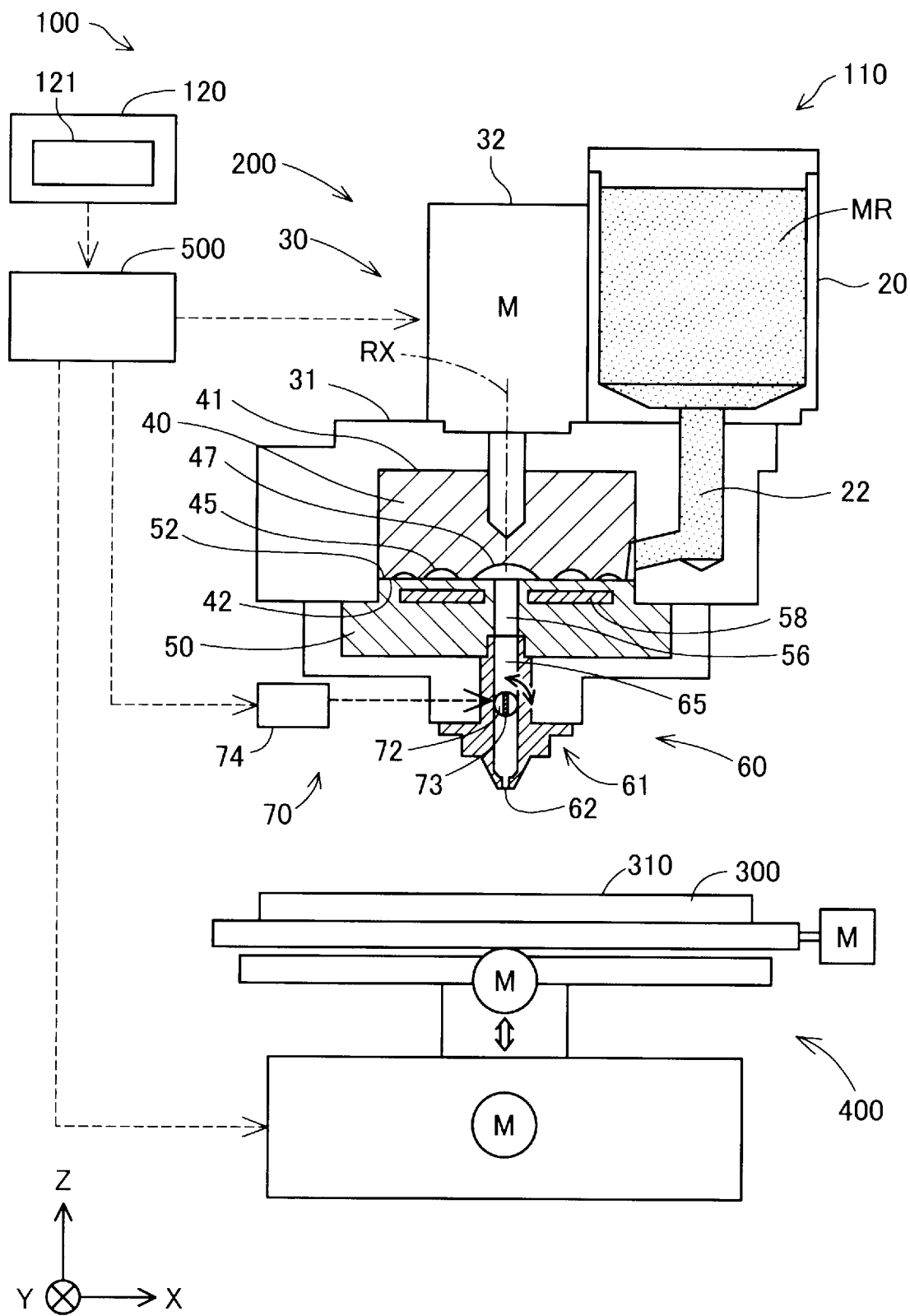
FIG. 1 is a diagram showing a schematic configuration of a three-dimensional shaping system.

FIG. 1 is a diagram showing a schematic configuration of a three-dimensional shaping system 100 according to a first embodiment. The three-dimensional shaping system 100 includes a three-dimensional shaping device 110 and an information processing device 120. FIG. 1 shows arrows indicating X, Y, and Z directions that are orthogonal to each other. The X direction and the Y direction are directions parallel to a horizontal surface and the Z direction is a direction opposite to a direction of gravity. The arrows indicating the X, Y, and Z directions are appropriately shown in other figures such that the shown directions correspond to those in FIG. 1. In the following description, when a direction is specified, "+" indicates a positive direction which is a direction indicated by an arrow, "−" indicates a negative direction which is a direction opposite to the direction indicated by the arrow, and positive and negative symbols are used together to indicate directions.

The three-dimensional shaping device 110 according to the present embodiment includes a shaping unit 200, a stage 300, a moving unit 400, and a control unit 500. The shaping unit 200 includes a nozzle 61. Under the control of the control unit 500, the three-dimensional shaping device 110 stacks layers of a shaping material on the stage 300 and shapes a three-dimensional shaped object having a desired shape by discharging the shaping material from the nozzle 61 while changing a relative position between the nozzle 61 and the stage 300. The shaping material may also be referred to as a molten material.

The shaping unit 200 includes a material supply unit 20 that is a supply source of a material MR, a plasticizing unit 30 that plasticizes the material MR into a shaping material, and a discharge unit 60 that is provided with the above-described nozzle 61. The term "plasticize" refers to that a thermoplastic material is heated and melted. The term "melt" not only refers to that the thermoplastic material is heated to a temperature equal to or higher than a melting point and becomes a liquid, but also refers to that the thermoplastic material is softened and exhibits fluidity by being heated to a temperature equal to or higher than a glass transition point.

The material supply unit 20 supplies the material MR for generating the shaping material to the plasticizing unit 30. In the present embodiment, an ABS resin formed into a pellet form is used as the material MR. In the present embodiment, the material supply unit 20 is implemented by a hopper that accommodates the material MR. A supply path 22 that couples the material supply unit 20 and the plasticizing unit 30 is provided below the material supply unit 20. The material MR accommodated in the material supply unit 20 is supplied to the plasticizing unit 30 via the supply path 22.

The plasticizing unit 30 plasticizes the material MR supplied from the material supply unit 20 into a shaping material and supplies the shaping material to the discharge unit 60. The plasticizing unit 30 includes a screw case 31, a drive motor 32, a flat screw 40, a barrel 50, and a heating unit 58. The screw case 31 is a housing that accommodates the flat screw 40. The barrel 50 is fixed to a lower end portion of the screw case 31. The flat screw 40 is accommodated in a space surrounded by the screw case 31 and the barrel 50.

The flat screw 40 has a substantially cylindrical shape whose height in a direction along a central axis RX of the flat screw 40 is smaller than a diameter thereof. The flat screw 40 is provided in the screw case 31 such that the central axis RX is parallel to the Z direction. An upper surface 41 side of the flat screw 40 is coupled to the drive motor 32, and the flat screw 40 is rotated about the central axis RX in the screw case 31 by a torque generated by the drive motor 32. The flat screw 40 has, on a side opposite to the upper surface 41, a groove forming surface 42 on which a groove portion 45 is formed. The barrel 50 has a screw facing surface 52 that faces the groove forming surface 42 of the flat screw 40. A through hole 56 communicating with the discharge unit 60 is provided at a center of the screw facing surface 52.

Figure 2:
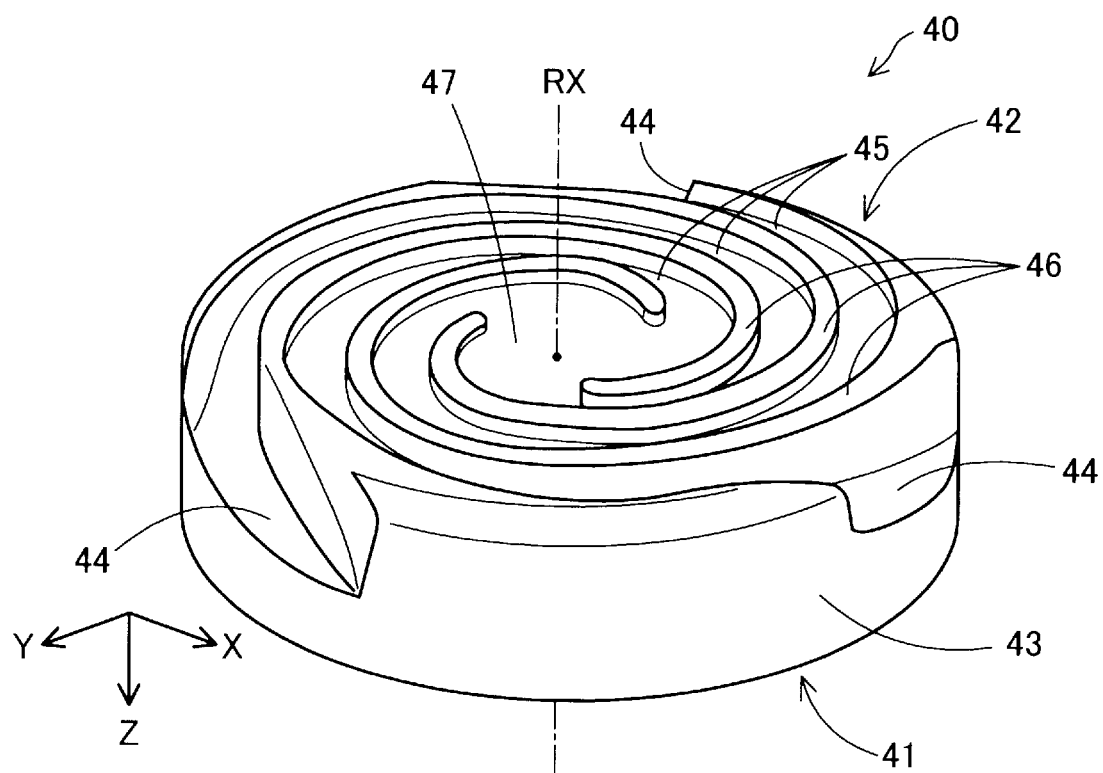
FIG. 2 is a perspective view showing a configuration of a flat screw.

FIG. 2 is a perspective view showing a configuration of the flat screw 40. FIG. 2 shows the flat screw 40 upside down from FIG. 1 in order to facilitate understanding of the technique. In FIG. 2, a position of the central axis RX of the flat screw 40 is indicated by a dash-dot line. A central portion 47 of the groove forming surface 42 of the flat screw 40 is formed into a recess to which one end of the groove portion 45 is coupled. The central portion 47 faces the through hole 56 of the barrel 50 shown in FIG. 1. The central portion 47 intersects the central axis RX. In the present embodiment, the groove portion 45 extends in a vortex shape from the central portion 47 in a manner of drawing arcs toward an outer periphery of the flat screw 40. The groove portion 45 may extend in an involute curve shape or a spiral shape. The groove forming surface 42 is provided with a ridge portion 46 that constitutes a side wall portion of the groove portion 45 and extends along the groove portion 45. The groove portion 45 is continuous up to a material introduction port 44 formed on a side surface 43 of the flat screw 40. The material introduction port 44 receives the material MR supplied via the supply path 22 of the material supply unit 20. The material MR introduced into the groove portion 45 from the material introduction port 44 is conveyed toward the central portion 47 in the groove portion 45 by rotation of the flat screw 40.

FIG. 2 shows the flat screw 40 having three groove portions 45 and three ridge portions 46. The number of the groove portions 45 and the ridge portions 46 provided at the flat screw 40 is not limited to three. The flat screw 40 may be provided with only one groove portion 45, or two or more groove portions 45. The number of the ridge portions 46 may be any number corresponding to the number of the groove portions 45. FIG. 2 shows the flat screw 40 in which three material introduction ports 44 are formed. The material introduction port 44 provided at the flat screw 40 is not limited to being provided at three positions. The flat screw 40 may be provided with the material introduction port 44 at only one position, or two or more positions.

Figure 3:
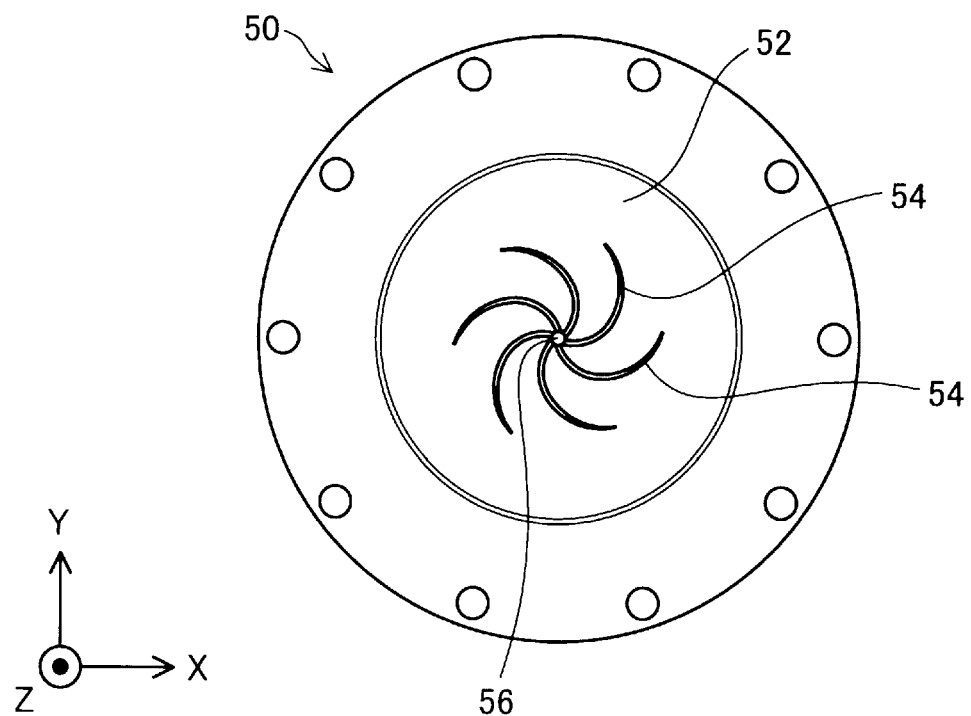
FIG. 3 is a top view showing a configuration of a barrel.

FIG. 3 is a top view showing a configuration of the barrel 50. As described above, the through hole 56 communicating with the discharge unit 60 is formed at the center of the screw facing surface 52. A plurality of guide grooves 54 are formed around the through hole 56 on the screw facing surface 52. One end of each of the guide grooves 54 is coupled to the through hole 56, and each of the guide grooves 54 extends in a vortex shape from the through hole 56 toward an outer periphery of the screw facing surface 52. Each of the guide grooves 54 has a function of guiding the shaping material into the through hole 56. The screw facing surface 52 may not be provided with the guide grooves 54.

As shown in FIG. 1, the heating unit 58 for heating the material MR is embedded in the barrel 50. The heating unit 58 may not be embedded in the barrel 50, and, for example, may be provided below the barrel 50. In the present embodiment, the heating unit 58 is implemented by a heater that generates heat when receiving supply of electric power. A temperature of the heating unit 58 is controlled by the control unit 500. The material MR conveyed in the groove portion 45 is plasticized by shear due to the rotation of the flat screw 40 and heat from the heating unit 58, and is thus formed into a paste-like shaping material. The shaping material is supplied from the through hole 56 to the discharge unit 60.

The discharge unit 60 discharges the shaping material supplied from the plasticizing unit 30. The discharge unit 60 includes the nozzle 61, a flow path 65, and an opening and closing mechanism 70. The nozzle 61 is provided at a lower end portion of the discharge unit 60. A nozzle hole 62 for discharging the shaping material is provided at a lower end portion of the nozzle 61. In the present embodiment, the nozzle 61 is provided with the nozzle hole 62 having a circular opening shape. The opening shape of the nozzle hole 62 may not be circular, and may be, for example, an elliptical shape or a polygonal shape such as a square shape. The flow path 65 communicates with the through hole 56 of the barrel 50 and the nozzle hole 62, and the shaping material flows from the through hole 56 toward the nozzle hole 62. The shaping material flowing through the flow path 65 is discharged from the nozzle hole 62.

The opening and closing mechanism 70 opens or closes the flow path 65 to control discharging of the shaping material from the nozzle 61. In the present embodiment, the opening and closing mechanism 70 is implemented by a butterfly valve. The opening and closing mechanism 70 includes a drive shaft 72 which is a shaft-like member, a valve body 73 that opens or closes the flow path 65 in accordance with rotation of the drive shaft 72, and a valve drive unit 74 that rotates the drive shaft 72.

The drive shaft 72 is attached to an intermediate portion of the flow path 65 so as to intersect a flow direction of the shaping material. In the present embodiment, the drive shaft 72 is attached so as to be parallel to the Y direction which is a direction perpendicular to the flow direction of the shaping material in the flow path 65. The drive shaft 72 is rotatable about a central axis along the Y direction.

The valve body 73 is a plate-shaped member that is rotated in the flow path 65. In the present embodiment, the valve body 73 is formed by processing a portion of the drive shaft 72 provided in the flow path 65 into a plate shape. A shape of the valve body 73 when viewed from a direction perpendicular to a plate surface of the valve body 73 is substantially the same as an opening shape of the flow path 65 at a portion of the flow path 65 where the valve body 73 is provided.

The valve drive unit 74 rotates the drive shaft 72 under the control of the control unit 500. The valve drive unit 74 is implemented by, for example, a stepping motor. The valve body 73 is rotated in the flow path 65 by the rotation of the drive shaft 72.

When the plate surface of the valve body 73 is held by the valve drive unit 74 perpendicularly to a direction in which the shaping material flows in the flow path 65, the supply of the shaping material from the flow path 65 to the nozzle 61 is cut off, and the discharge of the shaping material from the nozzle 61 is stopped. When the drive shaft 72 is rotated by the valve drive unit 74 and the plate surface of the valve body 73 is held at an acute angle with respect to the direction in which the shaping material flows in the flow path 65, the supply of the shaping material from the flow path 65 to the nozzle 61 is started, and the shaping material is discharged from the nozzle 61 at a discharge amount corresponding to a rotation angle of the valve body 73. As shown in FIG. 1, when the plate surface of the valve body 73 is held by the valve drive unit 74 parallel to the direction in which the shaping material flows in the flow path 65, flow path resistance of the flow path 65 is smallest. In this state, a discharge amount of the shaping material from the nozzle 61 per unit time is largest. In this manner, the opening and closing mechanism 70 can switch ON and OFF of the discharge of the shaping material and adjust the discharge amount of the shaping material.

The stage 300 has a shaping surface 310 facing the nozzle 61. A three-dimensional shaped object is formed on the shaping surface 310. In the present embodiment, the shaping surface 310 is parallel to a horizontal direction. The stage 300 is supported by the moving unit 400.

The moving unit 400 changes a relative position between the nozzle 61 and the shaping surface 310. In the present embodiment, the moving unit 400 changes the relative position between the nozzle 61 and the shaping surface 310 by moving the stage 300. The moving unit 400 according to the present embodiment is implemented by a three-axis positioner that moves the stage 300 in three axis directions which are the X, Y and Z directions by power generated by three motors. Each motor is driven under the control of the control unit 500. The moving unit 400 may be configured to change the relative position between the nozzle 61 and the shaping surface 310 by moving the shaping unit 200 without moving the stage 300. Alternatively, the moving unit 400 may be configured to change the relative position between the nozzle 61 and the shaping surface 310 by moving both the stage 300 and the shaping unit 200.

The control unit 500 is implemented by a computer including one or more processors, a main storage device, and an input and output interface that inputs a signal from the outside and outputs a signal to the outside. In the present embodiment, the control unit 500 performs various functions by executing a program or an instruction read on the main storage device by the processor. The control unit 500 controls an operation of the shaping unit 200 and the moving unit 400 in accordance with shaping data generated by the information processing device 120 to form a three-dimensional shaped object on the stage 300. The operation includes changing a three-dimensional relative position between the shaping unit 200 and the stage 300. The control unit 500 may be implemented by a combination of a plurality of circuits instead of a computer.

The information processing device 120 is coupled to the control unit 500 of the three-dimensional shaping device 110. The information processing device 120 is implemented by a computer including one or more processors, a main storage device, and an input and output interface that inputs a signal from the outside and outputs a signal to the outside. In addition to a function of serving as a data generation unit 121, the information processing device 120 performs various functions by executing a program or an instruction read on the main storage device by the processor. The information processing device 120 may be implemented by a combination of a plurality of circuits instead of a computer.

The data generation unit 121 generates shaping data for shaping a three-dimensional shaped object by the three-dimensional shaping device 110. The data generation unit 121 generates the shaping data using shape data indicating a three-dimensional shape of the three-dimensional shaped object. Data of an STL format, an AMF format, or the like that is generated using three-dimensional CAD software, three-dimensional CG software, or the like is used as the shape data. The shaping data includes path information indicating a discharge path of the shaping material and discharge amount information indicating a discharge amount of the shaping material discharged from the nozzle 61. The discharge path of the shaping material refers to a path in which the nozzle 61 moves relatively along the shaping surface 310 of the stage 300 while discharging the shaping material.

The discharge path includes a plurality of partial paths. Each partial path is a linear path. The discharge amount information is individually associated with each partial path. In the present embodiment, the discharge amount indicated by the discharge amount information is an amount of the shaping material discharged per unit time along a corresponding partial path. In another embodiment, the discharge amount indicated by the discharge amount information may be a total amount of the shaping material discharged along all partial paths.

Figure 4:
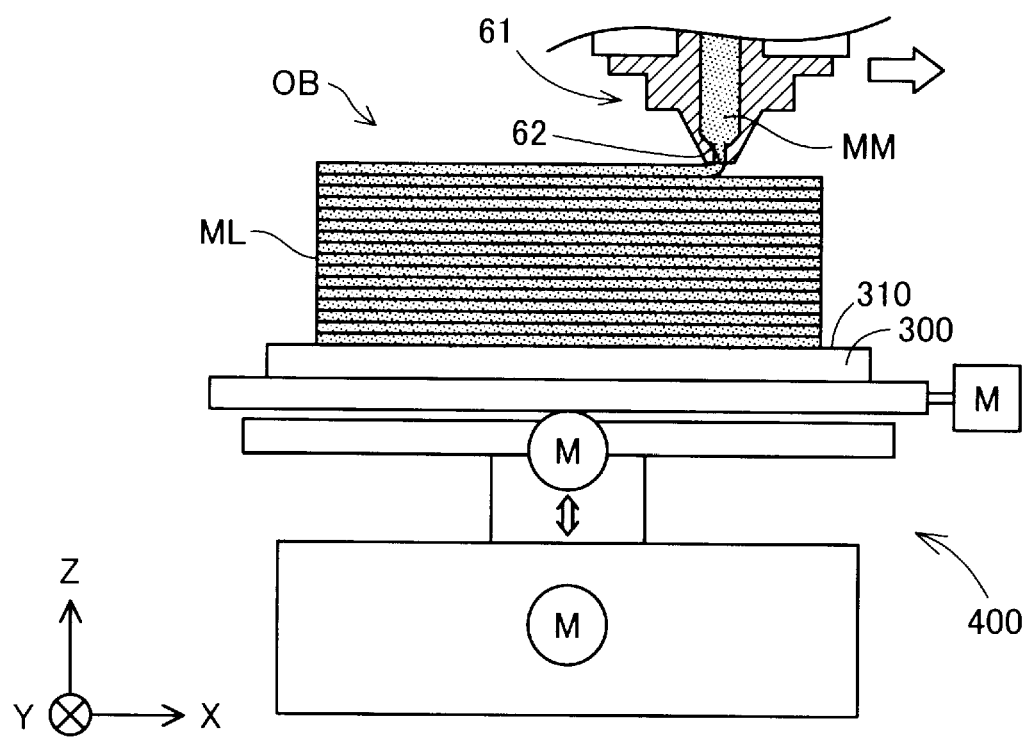
FIG. 4 is a diagram schematically showing a state in which a three-dimensional shaped object is shaped.

FIG. 4 is a diagram schematically showing a state in which a three-dimensional shaped object OB is shaped by the three-dimensional shaping device 110. In the three-dimensional shaping device 110, as described above, the plasticizing unit 30 generates a shaping material MM by plasticizing the material MR in a solid state supplied to the groove portion 45 of the flat screw 40 in rotation. The shaping material MM is discharged from the nozzle 61 while the control unit 500 maintains a distance between the shaping surface 310 of the stage 300 and the nozzle 61 and changes the position of the nozzle 61 relative to the shaping surface 310. The shaping material MM discharged from the nozzle 61 is linearly deposited along a discharge path along which the nozzle 61 moves.

The control unit 500 repeats the discharge of the shaping material MM from the nozzle 61 to form a layer ML. After one layer ML is formed, the control unit 500 moves the position of the nozzle 61 relative to the shaping surface 310 in a +Z direction. Then, other layers MLs are stacked on the formed layer ML, so as to form a three-dimensional shaped object OB.

The control unit 500 may temporarily pause the discharge of the shaping material from the nozzle 61, for example, when the nozzle 61 is moved relative to the shaping surface 310 in the +Z direction after formation of one layer ML is completed or when a discontinuous discharge path is present in each layer. In this case, the control unit 500 stops the discharge of the shaping material MM from the nozzle 61 by closing the flow path 65 by the valve body 73 of the opening and closing mechanism 70. After the control unit 500 changes the position of the nozzle 61, the flow path 65 is opened by the valve body 73 of the opening and closing mechanism 70, whereby the deposition of the shaping material MM from the changed position of the nozzle 61 is resumed. According to the three-dimensional shaping device 110, a deposition position of the shaping material MM discharged by the nozzle 61 can be easily controlled by the opening and closing mechanism 70.

Figure 5:
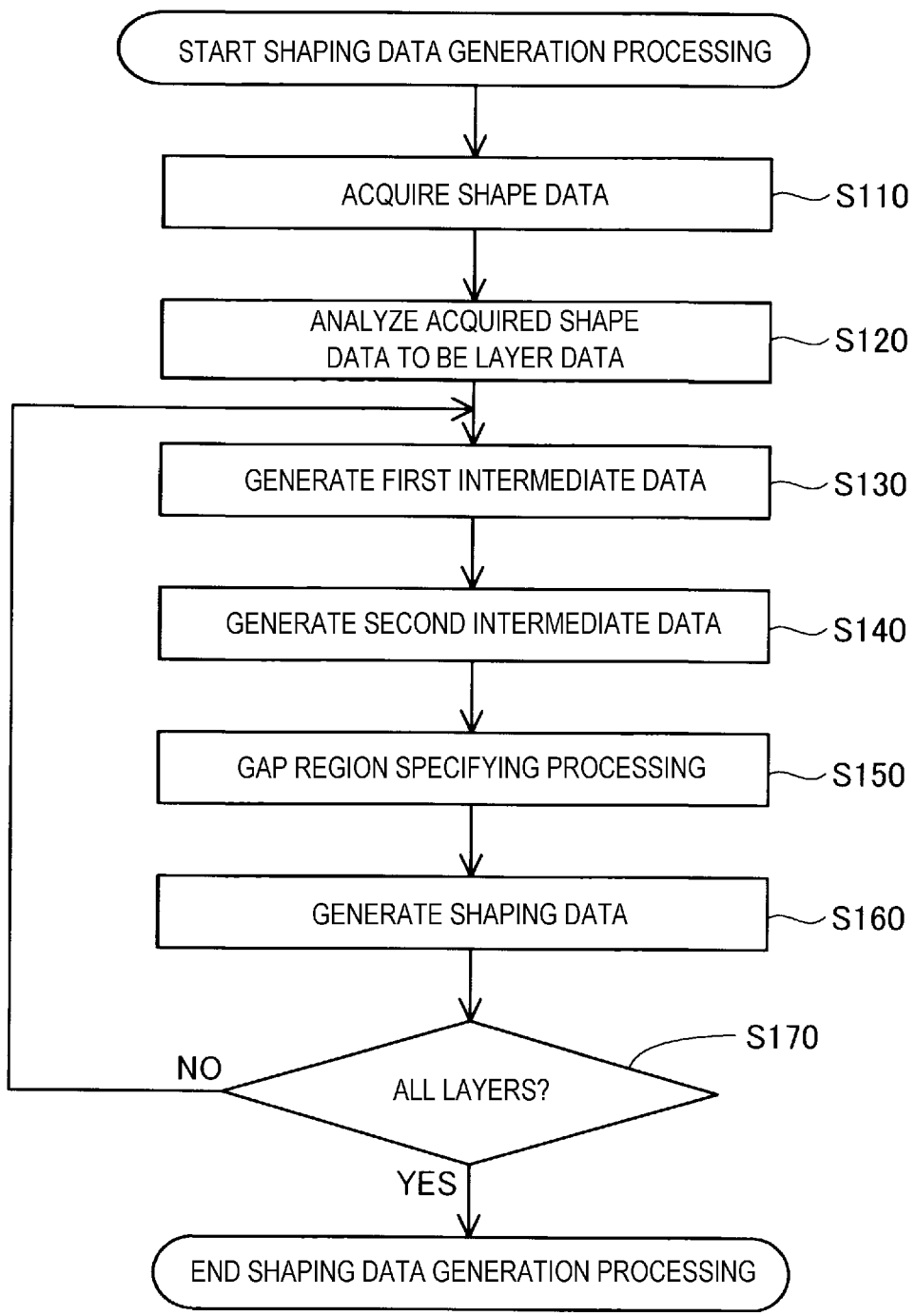
FIG. 5 is a flowchart showing contents of a shaping data generation processing.

FIG. 5 is a flowchart showing contents of a shaping data generation processing executed by the data generation unit 121 of the information processing device 120. This processing is a processing for generating shaping data to be used for shaping the three-dimensional shaped object prior to shaping of the three-dimensional shaped object. This processing is started by the information processing device 120 when a predetermined start instruction is supplied to the information processing device 120.

First, in step S110, the data generation unit 121 acquires shape data indicating a three-dimensional shape of the three-dimensional shaped object. The data generation unit 121 acquires the shape data from a recording medium such as a USB memory or a computer coupled to the information processing device 120. Next, in step S120, the data generation unit 121 analyzes the acquired shape data, slices the three-dimensional shaped object indicated by the shape data into a plurality of layers on a plane parallel to an XY plane, and generates layer data. The layer data indicates a contour line of the three-dimensional shaped object on the plane. A region surrounded by the contour line of the three-dimensional shaped object in a layer is referred to as a shaping region.

In step S130, the data generation unit 121 generates first intermediate data by analyzing the layer data. Each layer of the three-dimensional shaped object includes a shell portion and an infill portion. The shell portion is a portion along the contour line and is a portion that affects an appearance of the three-dimensional shaped object. The infill portion is a portion inside the shell portion and is a portion for ensuring strength of the three-dimensional shaped object. The first intermediate data includes path information and discharge amount information for shaping the shell portion, and path information and discharge amount information for shaping the infill portion. The data generation unit 121 first generates the path information and the discharge amount information for shaping the shell portion such that the shell portion is shaped along a discharge path having a predetermined pattern and with a predetermined thickness and a predetermined line width, and then generates the path information and the discharge amount information for shaping the infill portion such that the infill portion is shaped along a discharge path having a predetermined pattern and with a predetermined thickness and a predetermined line width, thereby generating the first intermediate data. The line width refers to a width of the shaping material that is linearly deposited along the discharge path. A region in the shaping region where the shell portion is shaped is referred to as a shell region and a region in the shaping region other than the shell region is referred to as an infill region.

Figure 6:
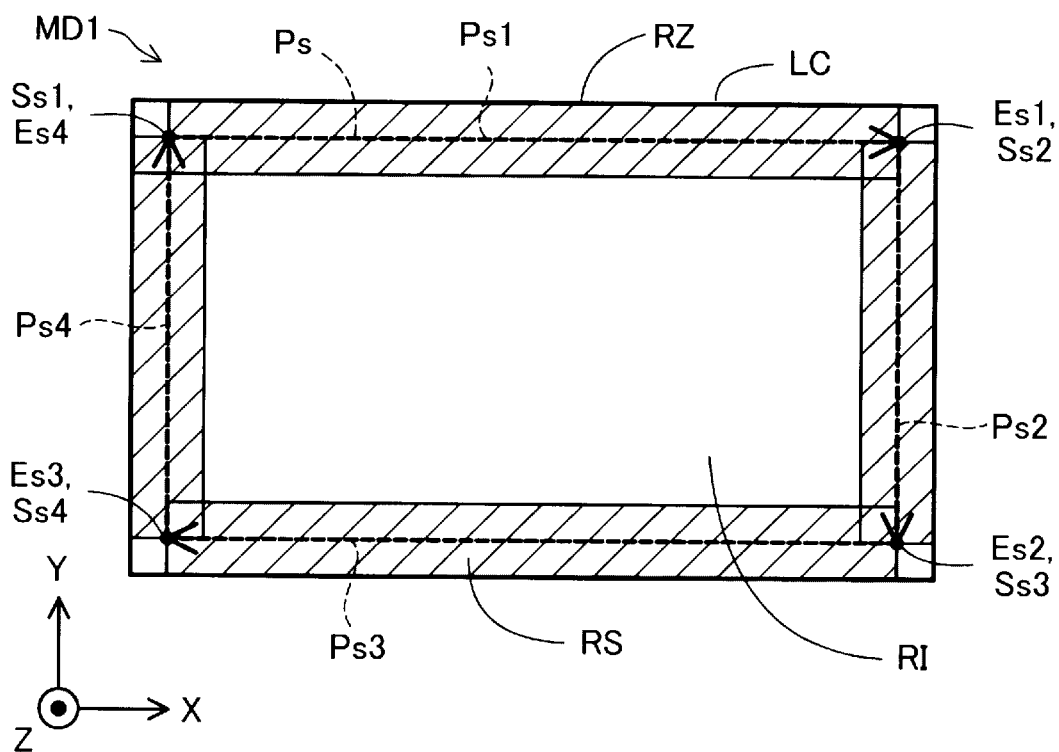
FIG. 6 is a first diagram showing an example of first intermediate data according to a first embodiment.
Figure 7:
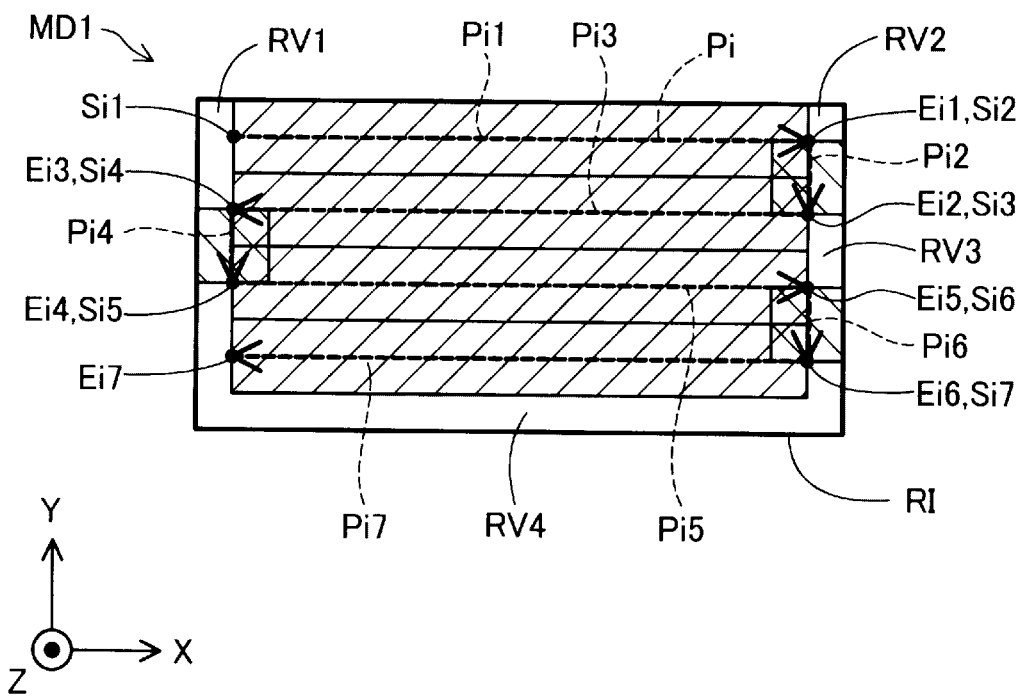
FIG. 7 is a second diagram showing an example of the first intermediate data according to the first embodiment.

FIG. 6 is a first diagram showing an example of first intermediate data MD1. FIG. 7 is a second diagram showing an example of the first intermediate data MD1. FIG. 6 shows an example of the first intermediate data MD1 indicating a discharge path Ps for shaping the shell portion in a shaping region RZ surrounded by a rectangular contour line LC. In FIG. 6, hatching is performed in a region where the shaping material is deposited along the discharge path Ps for shaping the shell portion. In this example, the shell portion is shaped with a predetermined reference line width. The discharge path Ps for shaping the shell portion is generated such that an outer peripheral edge of the shell portion is in contact with the contour line LC. The discharge path Ps for shaping the shell portion is generated so as to surround an inner side of the contour line LC for one round. The discharge path Ps for shaping the shell portion is implemented by coupling a partial path Ps1, a partial path Ps2, a partial path Ps3, and a partial path Ps4 in this order. The partial paths Ps1 to Ps4 linearly extend from respective start points Ss1 to Ss4 toward respective end points Es1 to Es4. The partial paths Ps1 to Ps4 each linearly extend along the contour line LC. In this example, a rectangular infill region RI is formed inside a shell region RS where the shell portion is shaped. The discharge path Ps for shaping the shell portion indicated by the first intermediate data may further include a partial path in one round inside the above-described partial paths Ps1 to Ps4. The shell portion may be shaped with a line width different from the reference line width.

FIG. 7 shows an example of the first intermediate data MD1 indicating a discharge path Pi for shaping the infill portion in the infill region RI shown in FIG. 6. In FIG. 7, hatching is performed in a region where the shaping material is deposited along the discharge path Pi for shaping the infill portion. In this example, the infill portion is shaped with a reference line width. The discharge path Pi for shaping the infill portion is formed in a pattern that meanders in an S-shape. The discharge path Pi for shaping the infill portion is formed so as to extend gradually in a −Y direction while reciprocating in parallel to a long side between a short side at a −X direction side and a short side at a +X direction side in the rectangular infill region RI. The discharge path Pi for shaping the infill portion is implemented by coupling a partial path Pi1, a partial path Pi2, a partial path Pi3, a partial path Pi4, a partial path Pi5, a partial path Pi6, and a partial path Pi7 in this order. The partial paths Pi1 to Pi7 extend linearly from respective start points Si1 to Si7 toward respective endpoints Ei1 to Ei7. The start points Si1 to Si7 and the end points Ei1 to Ei7 of respective partial paths Pi1 to Pi7 are formed at an interval of half the reference line width from an outer peripheral edge of the infill region RI. The partial paths Pi1, Pi3, Pi5, and Pi7 extending parallel to a long side of the infill region RI are formed at an interval of the reference line width. In a region at a −Y direction side with respect to a region where the shaping material is deposited along the partial path Pi7, since a width of the region is smaller than the reference line width, no partial path is formed.

A gap region may be formed in the infill region. The gap region refers to a region in the infill region other than the region where the shaping material is deposited. That is, the gap region is a region interposed between a region where the shaping material is deposited to shape the shell portion and a region where the shaping material is deposited to shape the infill portion, or a region interposed between a region where the shaping material is deposited to shape the infill portion and a region where the shaping material is deposited to shape the infill portion. In the example shown in FIG. 7, four gap regions RV1 to RV4 are formed in the infill region RI. The gap region may also be referred to as a void region.

As shown in FIG. 5, in step S140, the data generation unit 121 generates second intermediate data by changing at least one of the path information and the discharge amount information that are indicated by the first intermediate data such that an amount of the shaping material deposited along the discharge path is increased. In the present embodiment, the data generation unit 121 generates the second intermediate data by changing the first intermediate data such that the amount of the shaping material deposited along each partial path for shaping the infill portion is increased.

Figure 8:
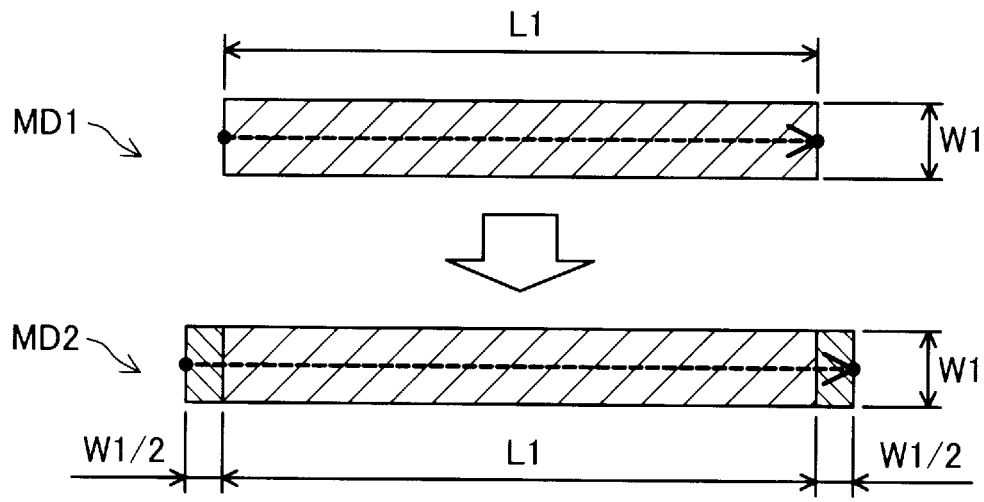
FIG. 8 is a diagram showing a state of changing to second intermediate data according to the first embodiment.

FIG. 8 is a diagram schematically showing a state in which the first intermediate data MD1 is changed to second intermediate data MD2 according to the present embodiment. A region where the shaping material is deposited along a partial path according to the path information and the discharge amount information that are indicated by the first intermediate data MD1 is shown at an upper side of FIG. 8. A region where the shaping material is deposited along a partial path according to path information and discharge amount information that are indicated by the second intermediate data MD2 is shown at a lower side of FIG. 8. In the present embodiment, for a partial path for shaping the infill portion, the data generation unit 121 increases a length of the partial path without changing a direction of the partial path, a thickness of the deposited shaping material, and a line width W1 of the deposited shaping material. The data generation unit 121 increases the length of the partial path by changing a position of the start point and a position of the end point of the partial path such that a length at a start point side of the partial path is extended by half the line width W1 and a length at an end point side of the partial path is extended by half the line width W1. The data generation unit 121 may add a partial path having a length half the line width W1 at the start point side of the partial path and add a partial path having a length half the line width W1 at the end point side of the partial path without changing the position of the start point and the position of the end point of the partial path.

Figure 9:
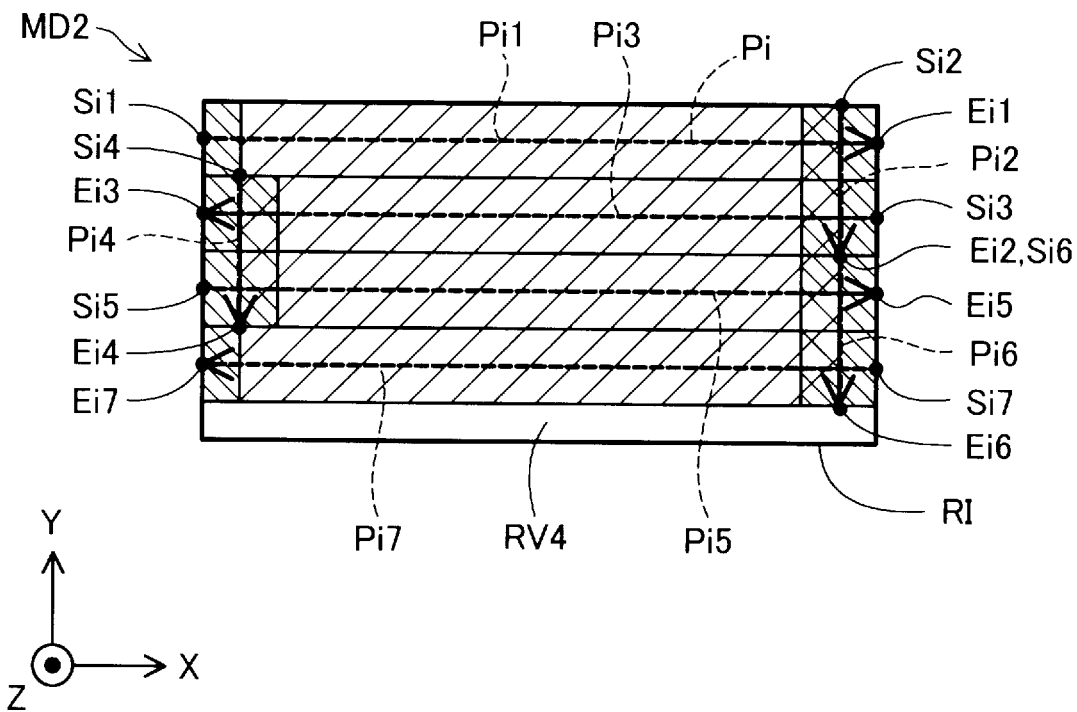
FIG. 9 is a diagram showing the second intermediate data according to the first embodiment.

FIG. 9 is a diagram showing an example of the second intermediate data MD2. FIG. 9 shows a state in which the discharge path Pi for shaping the infill portion shown in FIG. 7 is changed. As shown in FIG. 9, in the second intermediate data MD2, lengths of the partial paths Pi1 to Pi7 indicated by the second intermediate data MD2 are made longer than lengths of the partial paths Pi1 to Pi7 indicated by the first intermediate data MD1, so that the gap regions RV1 to RV3 shown in FIG. 7 are removed and a range of the gap region RV4 is reduced.

As shown in FIG. 5, in step S150, the data generation unit 121 executes a gap region specifying processing. In the gap region specifying processing, the data generation unit 121 analyzes the second intermediate data and specifies a gap region formed in the infill region. In the example shown in FIG. 9, the gap region RV4 is specified by the gap region specifying processing.

In step S160, the data generation unit 121 generates shaping data using the first intermediate data. When the gap region is specified by the gap region specifying processing, the data generation unit 121 generates the shaping data by changing at least one of the path information and the discharge amount information that are indicated by the first intermediate data such that the shaping material is deposited in at least a portion of the specified gap region. For example, according to a predetermined void ratio, the data generation unit 121 determines a region where the shaping material is deposited in the specified gap region. On the other hand, when no gap region is specified by the gap region specifying processing, the data generation unit 121 generates the shaping data without changing the path information and the discharge amount information that are indicated by the first intermediate data. The data generation unit 121 may generate the shaping data using the second intermediate data.

Figure 10:
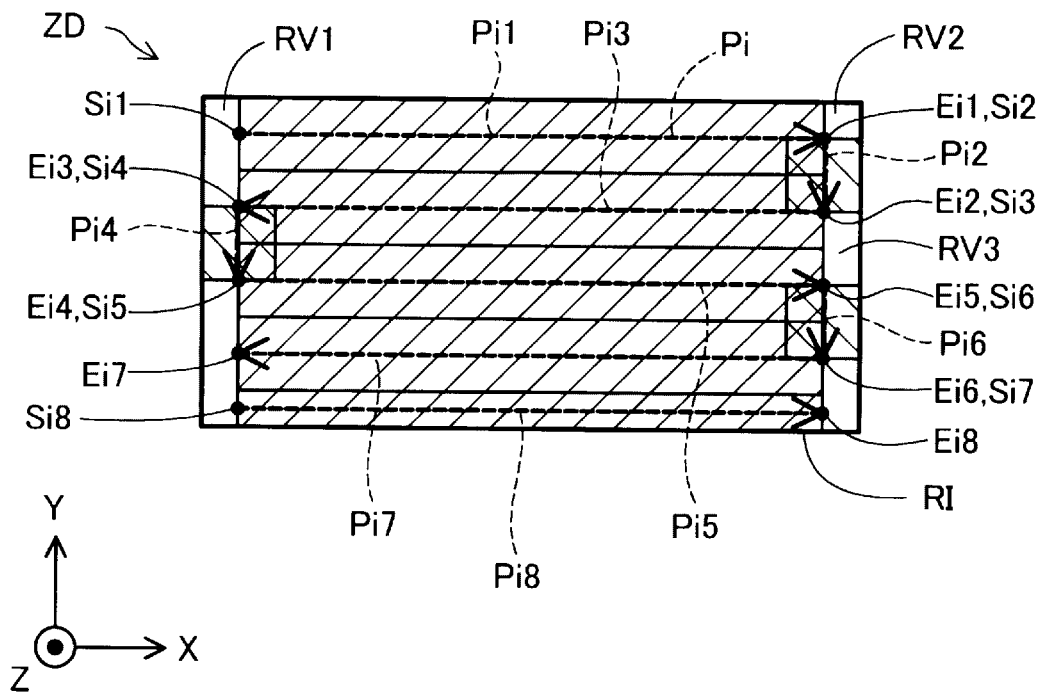
FIG. 10 is a diagram showing an example of shaping data according to the first embodiment.

FIG. 10 is a diagram showing an example of shaping data ZD. In the present embodiment, when a gap region is specified by the gap region specifying processing, the data generation unit 121 adds a discharge path so as to deposit the shaping material in at least a portion of the specified gap region. FIG. 10 shows the shaping data ZD in which a discharge path Pi8 is added such that the shaping material is deposited in the gap region RV4 shown in FIG. 9. The data generation unit 121 may generate the shaping data by increasing a line width of the partial path Pi7 closest to the gap region RV4 in the discharge path Pi for shaping the infill portion such that the shaping material is deposited in at least a portion of the specified gap region RV4. The data generation unit 121 may generate the shaping data by increasing a line width of the partial path Ps3 closest to the gap region RV4 in the discharge path Ps for shaping the shell portion shown in FIG. 6 such that the shaping material is deposited in at least a portion of the specified gap region RV4.

In step S170, the data generation unit 121 determines whether shaping data is generated for all layers. When it is determined in step S170 that shaping data is not generated for all layers, the data generation unit 121 returns the processing to step S130, repeats processings from step S130 to step S160 for other layers so as to generate shaping data for other layers, and executes a processing in step S170 again. On the other hand, when it is determined in step S170 that the shaping data is generated for all layers, the data generation unit 121 ends the processing. In the shaping data generation processing described above, step S110 is also referred to as a first step in a three-dimensional shaped object manufacturing method, step S130 is also referred to as a second step in the three-dimensional shaped object manufacturing method, step S140 and step S150 are also referred to as a third step in the three-dimensional shaped object manufacturing method, and step S160 is also referred to as a fourth step in the three-dimensional shaped object manufacturing method.

Figure 11:
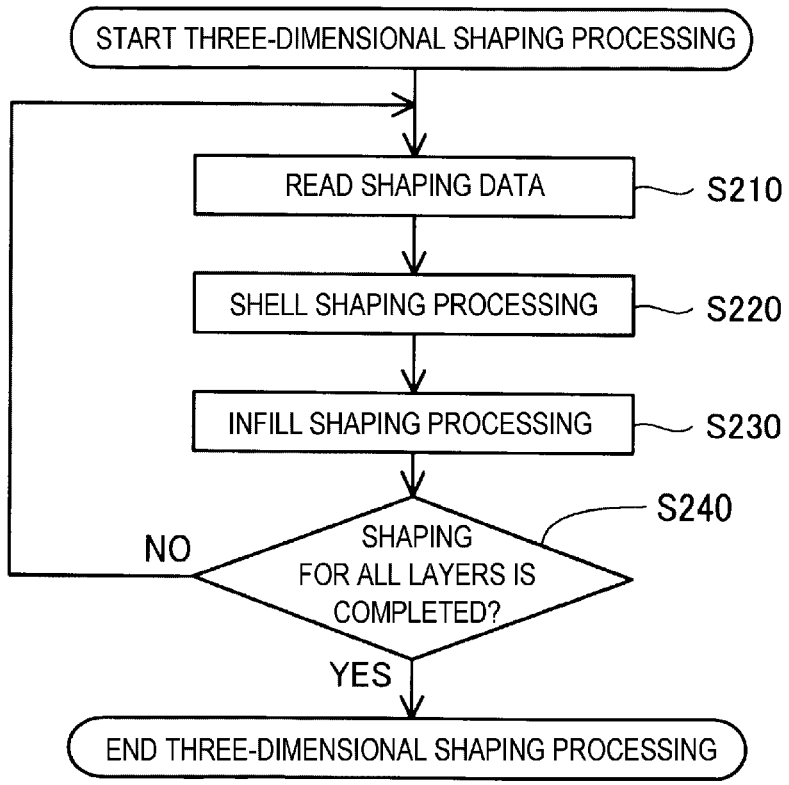
FIG. 11 is a flowchart showing contents of a three-dimensional shaping processing.

FIG. 11 is a flowchart showing contents of a three-dimensional shaping processing executed by the control unit 500. The three-dimensional shaping processing shown in FIG. 11 is a processing executed by the control unit 500 using the shaping data generated in the shaping data generation processing shown in FIG. 5. The shaping data generation processing shown in FIG. 5 and the three-dimensional shaping processing shown in FIG. 11 are executed to achieve the three-dimensional shaped object manufacturing method by the three-dimensional shaping system 100.

In step S210, the control unit 500 reads the shaping data of one layer among a plurality of layers constituting the three-dimensional shaped object. In the present embodiment, first, the control unit 500 reads the shaping data of a lowermost layer in the direction of gravity among the plurality of layers constituting the three-dimensional shaped object.

In step S220, the control unit 500 executes a shell shaping processing. In the shell shaping processing, the control unit 500 controls the shaping unit 200 and the moving unit 400 according to the path information for shaping the shell portion and the discharge amount information associated with the path information that are included in the read shaping data, and forms the shell portion in a current layer.

In step S230, the control unit 500 executes an infill shaping processing. In the infill shaping processing, the control unit 500 controls the shaping unit 200 and the moving unit 400 according to the path information for shaping the infill portion and the discharge amount information associated with the path information that are included in the read shaping data, and forms the infill portion in a current layer.

In step S240, the control unit 500 determines whether shaping for all layers is completed. When shaping for all layers is not completed, the control unit 500 repeats processings from step S210 to step S230 for a subsequent layer, that is, a layer adjacent to the current layer at an upper side in the direction of gravity. In step S220, prior to the discharge of the shaping material from the nozzle 61, the control unit 500 controls the moving unit 400 to raise the position of the nozzle 61 by one layer with respect to the stage 300. When shaping for all layers is completed, the control unit 500 ends the three-dimensional shaping processing. Step S220 and step S230 in the three-dimensional shaping processing described above are also referred to as a fifth step in the three-dimensional shaped object manufacturing method.

According to the three-dimensional shaping system 100 in the present embodiment described above, the data generation unit 121 of the information processing device 120 generates the first intermediate data using the shape data in the shaping data generation processing, and generates the second intermediate data by changing the first intermediate data such that a total amount of the shaping material deposited along partial paths when the shaping material is discharged from the nozzle 61 in accordance with the second intermediate data is larger than a total amount of the shaping material deposited along partial paths when the shaping material is discharged from the nozzle 61 in accordance with the first intermediate data. Therefore, the number or an area of the gap region indicated by the second intermediate data can be reduced compared with the number or an area of the gap region indicated by the first intermediate data. Since the data generation unit 121 specifies a gap region using the second intermediate data in which a minute gap region that does not need to be filled is removed, processings from specifying a gap region to generating the shaping data can be efficiently executed. Therefore, the time of the processing for filling a gap region can be prevented from being extended. In particular, in the present embodiment, the data generation unit 121 increases lengths of the partial paths indicated by the second intermediate data to be larger than lengths of the partial paths indicated by the first intermediate data, thereby increasing the total amount of the shaping material deposited along partial paths when the shaping material is discharged from the nozzle 61 in accordance with the second intermediate data to be larger than the total amount of the shaping material deposited along partial paths when the shaping material is discharged from the nozzle 61 in accordance with the first intermediate data. Therefore, the number or an area of a gap region formed at an end portion of each partial path can be reduced.

In the present embodiment, since the control unit 500 of the three-dimensional shaping device 110 executes the three-dimensional shaping processing using the shaping data generated by the shaping data generation processing described above, the three-dimensional shaped object can be efficiently shaped without filling a minute gap region that does not affect strength of the three-dimensional shaped object. Therefore, the time of the three-dimensional shaping processing can be prevented from being extended.

In the present embodiment, the shaping material can be deposited in a specified gap region by adding the discharge path to the shaping data. Therefore, a void ratio of the three-dimensional shaped object to be shaped can be reduced while the time of the processing for filling a gap region can be prevented from being extended.

Although a pellet-like ABS resin is used as the material MR in the present embodiment, examples of the material MR used in the shaping unit 200 may include a material for shaping the three-dimensional shaped object using various kinds materials as a main material, such as a thermoplastic material, a metal material, and a ceramic material. Here, the "main material" refers to a material serving as a center component for forming the shape of the three-dimensional shaped object, and refers to a material having a content of 50 mass % or more in the three-dimensional shaped object. The above-described shaping material includes a material obtained by melting the main material alone or a material obtained by melting the main material and a part of components contained in the main material into a paste form.

When the thermoplastic material is used as the main material, the plasticizing unit 30 generates the shaping material by plasticizing the thermoplastic material. The term "plasticize" refers to that the thermoplastic material is heated and melted. The term "melt" refers to that the thermoplastic material is softened and exhibits fluidity by being heated to a temperature equal to or higher than a glass transition point.

Examples of the thermoplastic material may include the following any one thermoplastic resin material or a combination of two or more thermoplastic resin materials.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyetheretherketone (PEEK)

Additives such as a pigment, a metal, a ceramic, a wax, a flame retardant, an antioxidant, and a heat stabilizer may be mixed into the thermoplastic material. In the plasticizing unit 30, the thermoplastic material is plasticized by the rotation of the flat screw 40 and the heating from the heating unit 58, and is converted into a melted state. After the shaping material formed in such a manner is discharged from the nozzle 61, the shaping material is cured due to a reduction in temperature.

It is desirable that the thermoplastic material is discharged from the nozzle 61 in a state of being melted completely by being heated to a temperature equal to or higher than the glass transition point thereof. The "state of being melted completely" refers to a state in which no unmelted thermoplastic material is present, and refers to a state in which no pellet-like solid object remains when, for example, a pellet-like thermoplastic resin is used in the material.

In the shaping unit 200, for example, the following metal material may be used as the main material instead of the above-described thermoplastic material. In this case, it is desirable that a component to be melted at the time of forming the shaping material is mixed into a powder material obtained by converting the following metal material into a powder, and then the mixture is charged into the plasticizing unit 30.

Example of Metal Material

A single metal of magnesium (Mg), iron (Fe), cobalt (Co), chromium (Cr), aluminum (Al), titanium (Ti), copper (Cu), and nickel (Ni), or an alloy containing one or more of these metals Example of Alloy Maraging steel, stainless steel, cobalt chrome molybdenum, titanium alloy, nickel alloy, aluminum alloy, cobalt alloy, and cobalt chromium alloy In the shaping unit 200, a ceramic material may be used as the main material instead of the above-described metal material. Examples of the ceramic material may include an oxide ceramic such as silicon dioxide, titanium dioxide, aluminum oxide, and zirconium oxide, and a non-oxide ceramic such as aluminum nitride. When the above-described metal material or ceramic material is used as the main material, the shaping material disposed on the stage 300 may be cured by, for example, irradiating with a laser or sintering with hot air or the like.

A powder material of the metal material or the ceramic material to be charged into the material supply unit 20 may be a mixed material obtained by mixing a plurality of types of powders of a single metal or an alloy and powders of a ceramic material. The powder material of the metal material or the ceramic material may be coated with, for example, a thermoplastic resin shown in the above-described example, or a thermoplastic resin other than those in the above-described example. In this case, the thermoplastic resin may be melted to exhibit fluidity in the plasticizing unit 30.

For example, the following solvents may be added to the powder material of the metal material or the ceramic material to be charged into the material supply unit 20. A solvent may be one solvent or a combination of two or more solvents selected from the following solvents.

Example of Solvent

Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, isopropyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, the following binders may be added to the powder material of the metal material or the ceramic material to be charged into the material supply unit 20.

Example of Binder

Acrylic resin, epoxy resin, silicone resin, cellulose resin or other synthetic resins or polylactic acid (PLA), polyamide (PA), polyphenylene sulfide (PPS), polyetheretherketone (PEEK) or other thermoplastic resins

B. Second Embodiment

Figure 12:
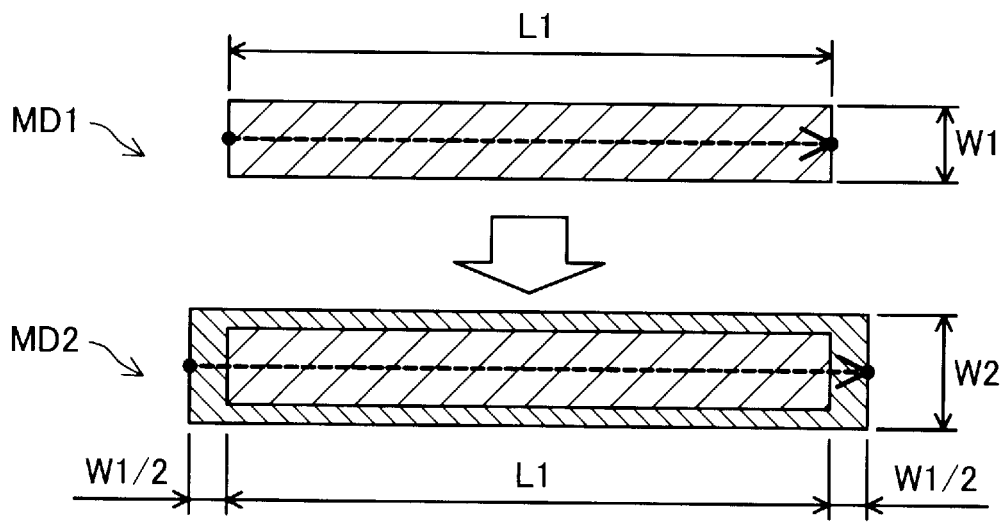
FIG. 12 is a diagram showing a state of changing to second intermediate data according to a second embodiment.

FIG. 12 is a diagram schematically showing a state in which the first intermediate data MD1 is changed to the second intermediate data MD2 by shaping data generation processing according to a second embodiment. The shaping data generation processing according to the second embodiment is different from that according to the first embodiment in that the data generation unit 121 generates the second intermediate data MD2 by increasing lengths and line widths of the partial paths indicated by the first intermediate data MD1. Other configurations are the same as those in the first embodiment unless otherwise specified.

In the present embodiment, the data generation unit 121 generates the second intermediate data MD2 by increasing a length of a partial path by changing a position of a start point and a position of an end point of the partial path such that a length at a start point side of the partial path is extended by half the line width W1 and a length at an endpoint side of the partial path is extended by half the line width W1, and by further increasing the line width W1 of the partial path to a line width W2 in accordance with a predetermined increase amount. The increase amount of the line width may be set in accordance with a variation degree of a discharge amount of the shaping material discharged from the nozzle 61 of the three-dimensional shaping device 110. For example, in the three-dimensional shaping processing, when the discharge amount of the shaping material discharged from the nozzle 61 varies by 5%, the increase amount of the line width may be set to 5%. The increase amount of the line width may be set in accordance with a movement error of the nozzle 61 moved by the moving unit 400 of the three-dimensional shaping device 110.

Figure 13:
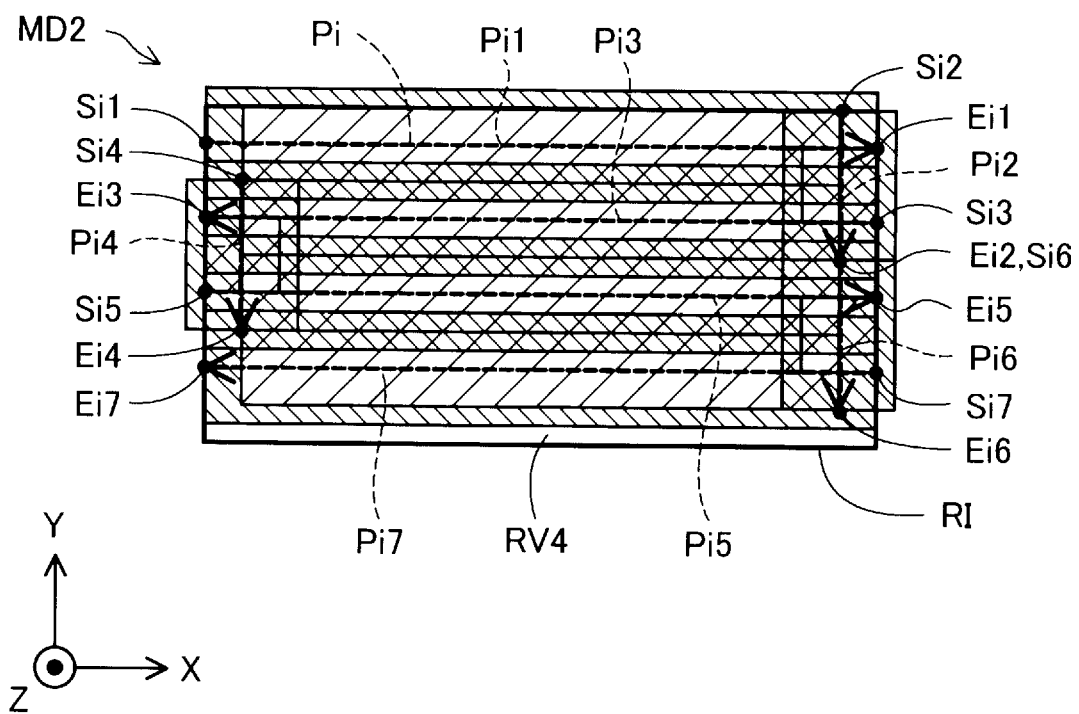
FIG. 13 is a diagram showing an example of the second intermediate data according to the second embodiment.

FIG. 13 is a diagram showing an example of the second intermediate data MD2 according to the present embodiment. As shown in FIG. 13, in the second intermediate data MD2 according to the present embodiment, the gap regions RV1 to RV3 formed in the vicinity of start points and end points of the partial paths Pi1 to Pi7 are removed similar to the first embodiment shown in FIG. 9, and further a range of the gap region RV4 is reduced to be smaller than the range of the gap region RV4 in the first embodiment.

Figure 14:
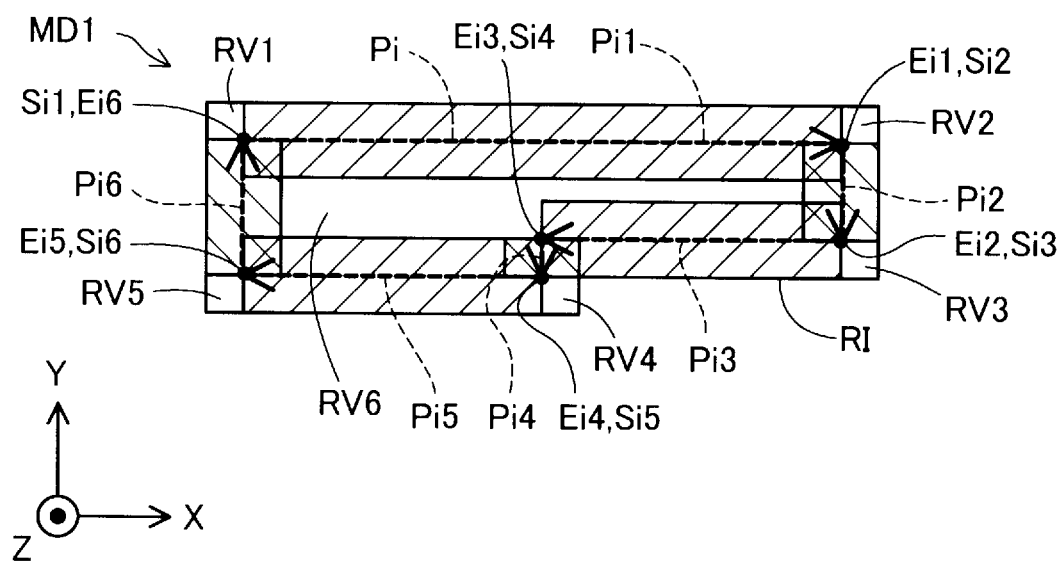
FIG. 14 is a diagram showing an example of first intermediate data according to the second embodiment.
Figure 15:
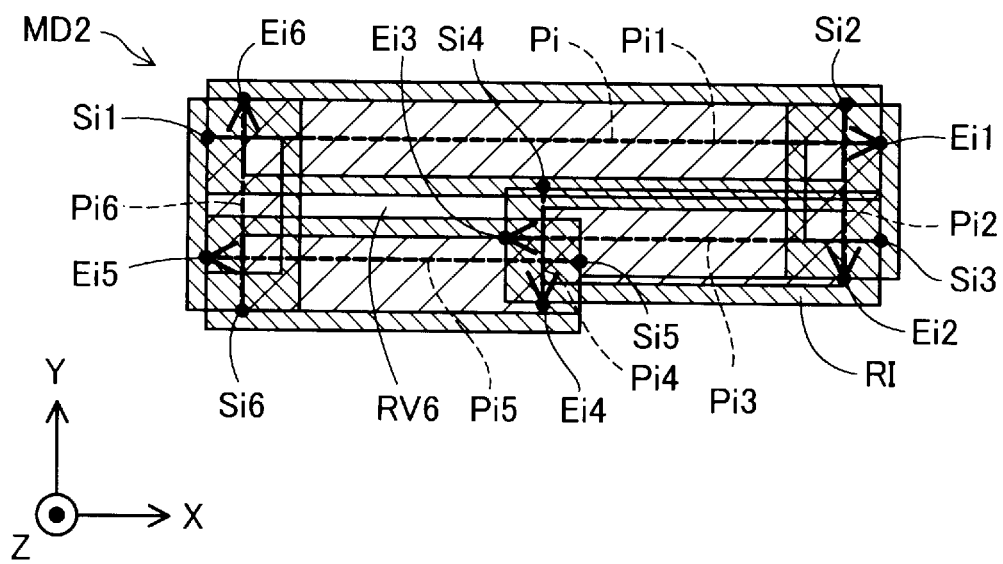
FIG. 15 is a diagram showing another example of the second intermediate data according to the second embodiment.

FIG. 14 is a diagram showing an another example of the first intermediate data MD1. FIG. 15 is a diagram showing another example of the second intermediate data MD2. As shown in FIG. 14, in this example, the first intermediate data MD1 is generated such that the partial paths Pi1 to Pi6 extend along an inner periphery of the shell portion. Gap regions RV1 to RV6 are formed in this example. As shown in FIG. 15, in the second intermediate data, the gap regions RV1 to RV5 formed in the vicinity of the start points and the end points of the partial paths Pi1 to Pi6 are removed, and further a range of the gap region RV6 formed between parallel partial paths is reduced.

According to the shaping data generation processing in the present embodiment described above, since the data generation unit 121 generates the second intermediate data by increasing the line widths and the lengths of the partial paths indicated by the first intermediate data and executes a gap region specifying processing using the second intermediate data, the number or a range of a gap region specified in the gap region specifying processing can be further reduced compared with the first embodiment. In particular, in the present embodiment, since the data generation unit 121 increases the line widths of the partial paths, the number or an area of a gap region formed between partial paths can be reduced.

C. Third Embodiment

Figure 16:
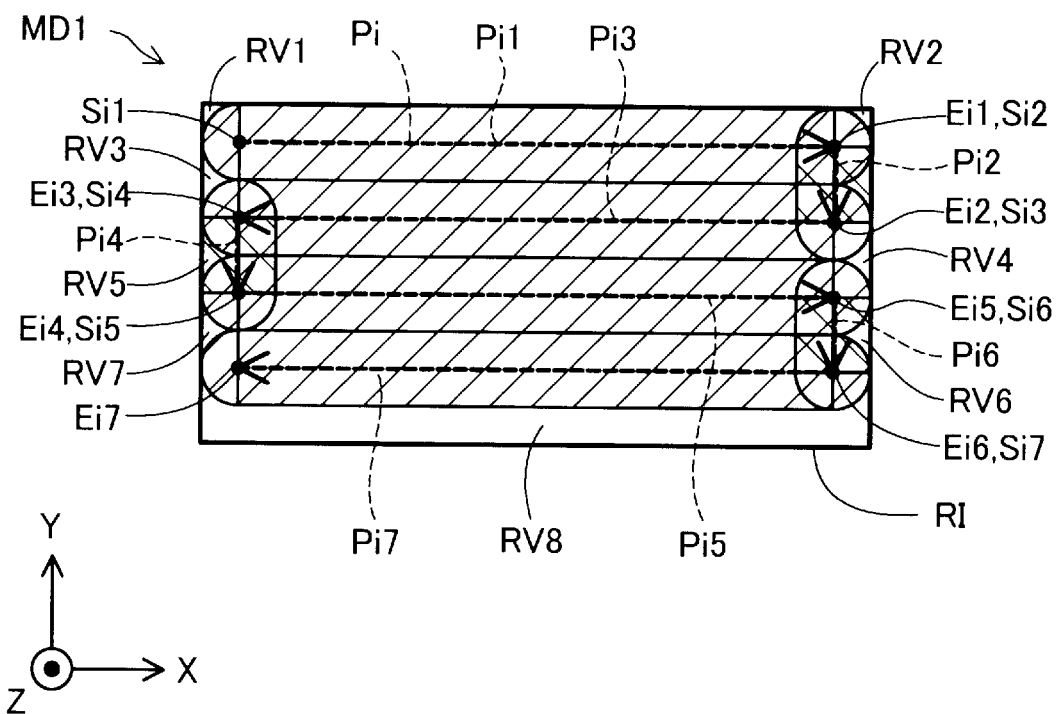
FIG. 16 is a diagram showing an example of first intermediate data according to a third embodiment.

FIG. 16 is a diagram showing an example of the first intermediate data MD1 according to a third embodiment. The shaping data generation processing according to the third embodiment is different from that according to the first embodiment in that the data generation unit 121 generates the first intermediate data by adding a semicircular region where the shaping material is deposited to each of the partial paths Pi1 to Pi7. The shaping data generation processing according to the third embodiment is different from that according to the first embodiment in that the data generation unit 121 generates the second intermediate data MD2 by changing a shape of a region indicated by the first intermediate data MD1. Other configurations are the same as those in the first embodiment unless otherwise specified. Gap regions RV1 to RV8 are formed in this example. The shape of the region is not limited to the semicircular shape, and may be, for example, a triangular shape.

Figure 17:
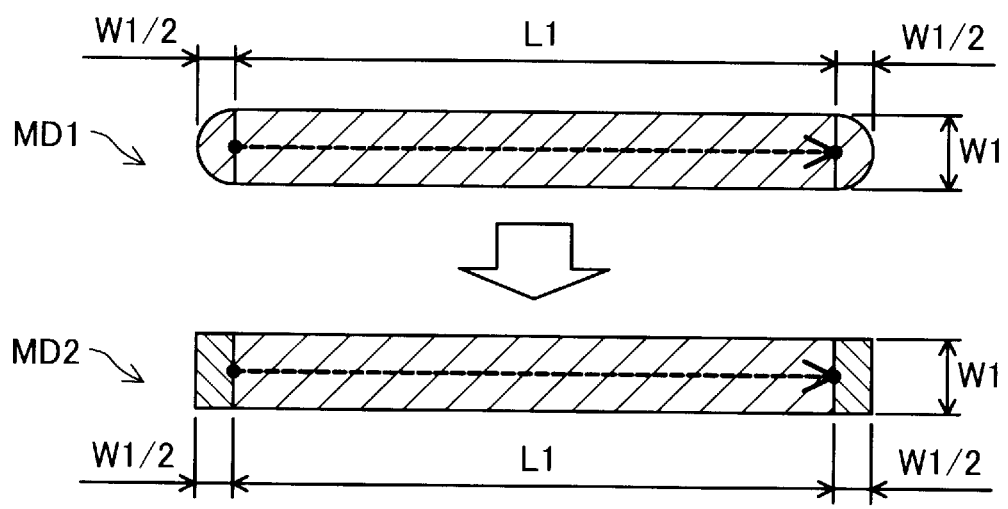
FIG. 17 is a diagram showing a state of changing to second intermediate data according to the third embodiment.

FIG. 17 is a diagram schematically showing a state in which the first intermediate data MD1 is changed to the second intermediate data MD2 by the shaping data generation processing according to the present embodiment. In the shaping data generation processing according to the present embodiment, the data generation unit 121 changes the semicircular region provided at an end portion of each partial path to a rectangular region. The data generation unit 121 changes the shape of the region so as to increase an area of the region. In the present embodiment, the data generation unit 121 changes the semicircular region having a radius half the line width W1 to a rectangular region having a length half the line width W1 and having a width the same as the line width W1. An amount of the shaping material deposited in a region is increased by increasing an area of the region.

Figure 18:
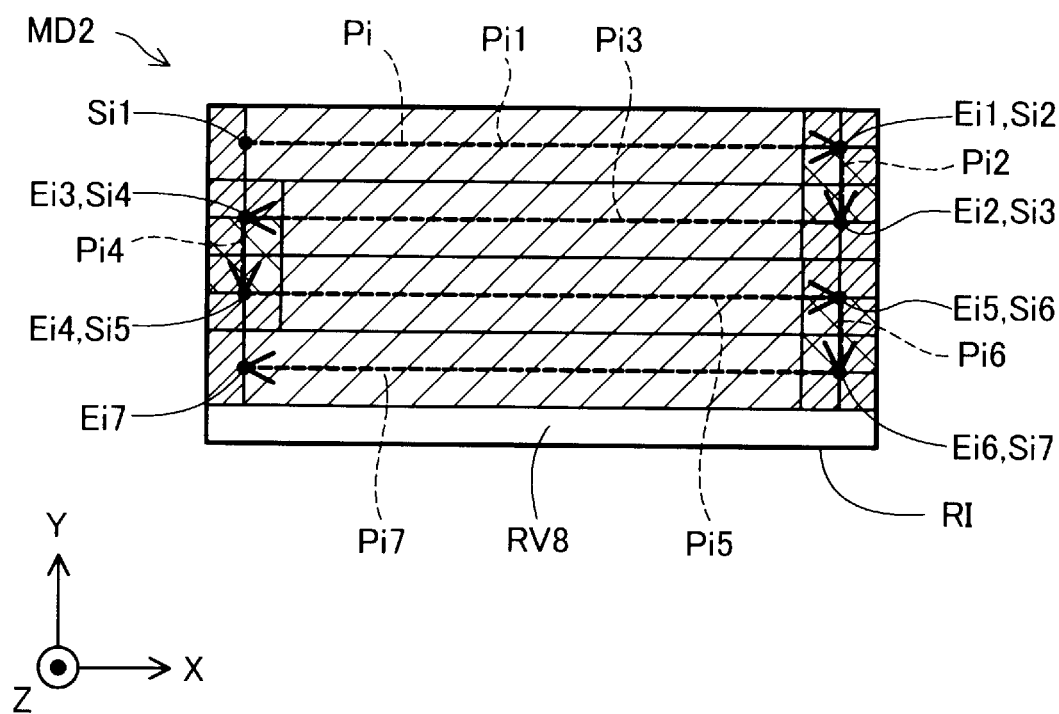
FIG. 18 is a diagram showing an example of the second intermediate data according to the third embodiment.

FIG. 18 is a diagram showing an example of the second intermediate data MD2 according to the present embodiment. In this example, the gap regions RV1 to RV7 are removed by changing a shape of a region provided at an end portion of each of the partial paths Pi1 to Pi7, and a range of the gap region RV8 is reduced.

According to the shaping data generation processing in the present embodiment described above, the data generation unit 121 changes the shape of the region that is provided at an end portion of each partial path and where the shaping material is deposited, so that the number or an area of a gap region specified in the gap region specifying processing can be reduced. In particular, even when the length of each partial path is not changed, the number or an area of a gap region formed in the vicinity of an end portion of each partial path can be reduced in the present embodiment. The first embodiment or the second embodiment may be combined with the present embodiment. That is, the data generation unit 121 may change a length of each partial path and a shape of a region provided at an end portion of each partial path, or may change a length and a line width of each partial path and a shape of a region provided at an end portion. Alternatively, the data generation unit 121 may change a line width of each partial path and a shape of a region provided at an end portion without changing a length of each partial path.

D. Other Embodiments (D1) In the shaping data generation processing according to the second embodiment described above, the data generation unit 121 generates the second intermediate data by increasing lengths and line widths of the partial paths indicated by the first intermediate data. In contrast, the data generation unit 121 may generate the second intermediate data by increasing the line widths without changing the lengths of the partial paths indicated by the first intermediate data.

(D2) In the shaping data generation processing according to the second embodiment described above, the data generation unit 121 may return a range of the gap region specified using the second intermediate data to a range indicated by the first intermediate data, and then add a discharge path or change a line width of a discharge path adjacent to the gap region. In this case, the time of the processing for filling the gap region can be prevented from being extended and the void ratio of the three-dimensional shaped object can be reduced.

(D3) A function of the data generation unit 121 that executes the shaping data generation processing in the embodiments described above may be incorporated in the control unit 500 of the three-dimensional shaping device 110. In this case, the three-dimensional shaping system 100 may not include the information processing device 120.

E. Other Aspects

The present disclosure is not limited to the embodiments described above, and can be implemented in various aspects without departing from the scope of the present disclosure. For example, the present disclosure can be implemented by the following aspects. In order to solve a part of or all of problems of the present disclosure, or to achieve a part of or all of effects of the present disclosure, technical characteristics in the above-described embodiments corresponding to technical characteristics in aspects to be described below can be replaced or combined as appropriate. The technical characteristics can be deleted as appropriate unless described as essential in the present specification.

(1) According to a first aspect of the present disclosure, there is provided a three-dimensional shaped object manufacturing method for manufacturing a three-dimensional shaped object by discharging a shaping material from a discharge unit toward a stage to stack layers. The three-dimensional shaped object manufacturing method includes a first step of acquiring shape data indicating a three-dimensional shape of the three-dimensional shaped object, a second step of generating, using the acquired shape data, first intermediate data including path information indicating a path along which the discharge unit moves while discharging the shaping material and discharge amount information indicating a discharge amount of the shaping material in the path, a third step of generating second intermediate data by changing the first intermediate data such that an amount of the shaping material deposited according to the second intermediate data is larger than an amount of the shaping material deposited according to the first intermediate data and specifying a gap region interposed between regions where the shaping material is deposited according to the second intermediate data, a fourth step of generating shaping data by changing the first intermediate data or the second intermediate data such that the shaping material is deposited in the specified gap region, and a fifth step of shaping the three-dimensional shaped object according to the shaping data.

According to the three-dimensional shaped object manufacturing method in this aspect, since the number or an area of a gap region indicated by the second intermediate data can be reduced compared with the number or an area of a gap region indicated by the first intermediate data generated using the shape data, processings from specifying the gap region to generating the shaping data can be efficiently executed. Therefore, the time of a processing for filling a gap region can be prevented from being extended.

(2) In the third step of the three-dimensional shaped object manufacturing method according to the aspect described above, the second intermediate data may be generated by changing the path information of the first intermediate data such that a length of a path indicated by the second intermediate data is increased to be larger than a length of a path indicated by the first intermediate data.

According to the three-dimensional shaped object manufacturing method in this aspect, the number or an area of a gap region specified at an end portion of the path can be reduced.

(3) In the third step of the three-dimensional shaped object manufacturing method according to the aspect described above, the second intermediate data may be generated by changing the discharge amount information of the first intermediate data such that a width of the shaping material deposited in the path indicated by the second intermediate data is larger than a width of the shaping material deposited in the path indicated by the first intermediate data.

According to the three-dimensional shaped object manufacturing method in this aspect, the number or an area of a gap region specified between paths can be reduced.

(4) In the third step of the three-dimensional shaped object manufacturing method according to the aspect described above, the second intermediate data may be generated by changing the first intermediate data such that a shape of the shaping material deposited at an end portion of the path according to the second intermediate data is a shape from a shape of the shaping material deposited at an end portion of the path according to the first intermediate data.

According to the three-dimensional shaped object manufacturing method in this aspect, the number or an area of a gap region specified at an end portion of the path can be reduced.

(5) In the fourth step of the three-dimensional shaped object manufacturing method according to the aspect described above, a path may be added to the gap region such that the shaping material is deposited in the gap region.

According to the three-dimensional shaped object manufacturing method in this aspect, the shaping material can be deposited in the specified gap region by adding the path. Therefore, a void ratio of the three-dimensional shaped object to be shaped can be reduced while the time of the processing for filling a gap region can be prevented from being extended.

(6) In the fourth step of the three-dimensional shaped object manufacturing method according to the aspect described above, discharge amounts in paths sandwiching the gap region may be increased such that the shaping material is deposited in the gap region.

According to the three-dimensional shaped object manufacturing method in this aspect, the shaping material can be deposited in the specified gap region by increasing a discharge amount of the shaping material along an existing path. Therefore, a void ratio of the three-dimensional shaped object to be shaped can be reduced while the time of the processing for filling a gap region can be prevented from being extended.

(7) In the fourth step of the three-dimensional shaped object manufacturing method according to the aspect described above, the gap region specified in the third step may be expanded to a region interposed between regions where the shaping material is deposited according to the first intermediate data, and the first intermediate data may be changed such that the shaping material is deposited in the expanded gap region.

According to the three-dimensional shaped object manufacturing method in this aspect, after the gap region is specified using the second intermediate data in which the number or an area of the gap region is reduced, an area of the specified gap region is returned to an original area and then the gap region is filled. Therefore, a void ratio of the three-dimensional shaped object to be shaped can be more reliably reduced while the time of the processing for filling a gap region can be prevented from being extended.

(8) According to a second aspect of the present disclosure, there is provided an information processing device that generates shaping data for shaping a three-dimensional shaped object by discharging a shaping material from a discharge unit toward a stage to stack layers. The information processing device includes a data generation unit that generates the shaping data using shape data indicating a three-dimensional shape of the three-dimensional shaped object. The data generation unit generates, by using the shape data, first intermediate data including path information indicating a path along which the discharge unit moves while discharging the shaping material and discharge amount information indicating a discharge amount of the shaping material in the path, generates second intermediate data by changing the first intermediate data such that an amount of the shaping material deposited according to the second intermediate data is larger than an amount of the shaping material deposited according to the first intermediate data and specifies a gap region interposed between regions where the shaping material is deposited according to the second intermediate data, and generates the shaping data by changing the first intermediate data or the second intermediate data such that the shaping material is deposited in the specified gap region.

According to the information processing device in this aspect, since the number or an area of the gap region indicated by the second intermediate data can be reduced compared with the number or an area of the gap region indicated by the first intermediate data generated using the shape data, processings from specifying a gap region to generating shaping data can be efficiently executed. Therefore, the time of the processing for filling a gap region can be prevented from being extended.

The present disclosure may be implemented in various aspects other than the three-dimensional shaped object manufacturing method. For example, the present disclosure can be implemented in aspects of an information processing device, a three-dimensional shaping device, and the like.

What is claimed is:

1. A three-dimensional shaped object manufacturing method for manufacturing a three-dimensional shaped object by depositing a shaping material from a depositing unit toward a stage to stack layers, the three-dimensional shaped object manufacturing method comprising:
   a first step of acquiring shape data indicating a three-dimensional shape of the three-dimensional shaped object;
   a second step of generating, using the acquired shape data, first intermediate data including path information indicating a path along which the depositing unit moves while depositing the shaping material and depositing amount information indicating a depositing amount of the shaping material in the path;
   a third step of generating second intermediate data by changing the first intermediate data such that an amount of the shaping material deposited according to the second intermediate data is larger than an amount of the shaping material deposited according to the first intermediate data, and specifying a gap region interposed between regions where the shaping material is deposited according to the second intermediate data;
   a fourth step of generating shaping data by changing the first intermediate data or the second intermediate data such that the shaping material is deposited in the specified gap region; and
   a fifth step of shaping the three-dimensional shaped object according to the shaping data.

2. The three-dimensional shaped object manufacturing method according to claim 1, wherein
   in the third step, the second intermediate data is generated by changing the path information of the first intermediate data such that a length of a path indicated by the second intermediate data is increased to be larger than a length of the path indicated by the first intermediate data.

3. The three-dimensional shaped object manufacturing method according to claim 1, wherein
   in the third step, the second intermediate data is generated by changing the depositing amount information of the first intermediate data such that a width of the shaping material deposited in the path indicated by the second intermediate data is larger than a width of the shaping material deposited in the path indicated by the first intermediate data.

4. The three-dimensional shaped object manufacturing method according to claim 1, wherein
   in the third step, the second intermediate data is generated by changing the first intermediate data such that a shape of the shaping material deposited at an end portion of the path according to the second intermediate data is different from a shape of the shaping material deposited at an end portion of the path according to the first intermediate data.

5. The three-dimensional shaped object manufacturing method according to claim 1, wherein
   in the fourth step, a path is added to the gap region such that the shaping material is deposited in the gap region.

6. The three-dimensional shaped object manufacturing method according to claim 1, wherein
   in the fourth step, depositing amounts in paths sandwiching the gap region are increased such that the shaping material is deposited in the gap region.

7. The three-dimensional shaped object manufacturing method according to claim 1, wherein
   in the fourth step,
   the gap region specified in the third step is expanded to a region interposed between regions where the shaping material is deposited according to the first intermediate data, and
   the first intermediate data is changed such that the shaping material is deposited in the expanded gap region.

8. A system comprising:
   an information processing device configured to generate shaping data for shaping a three-dimensional shaped object, the information processing device comprising a data generation unit configured to generate the shaping data using shape data indicating a three-dimensional shape of the three-dimensional shaped object; and
   a depositing unit configured to deposit the shaping material towards a stage to stack layers to form the three-dimensional shaped object according to the shaping data, wherein
   the data generation unit is configured to
   generate, using the shape data, first intermediate data including path information indicating a path along which the depositing unit moves while depositing the shaping material and depositing amount information indicating a depositing amount of the shaping material in the path,
   generate second intermediate data by changing the first intermediate data such that an amount of the shaping material deposited according to the second intermediate data is larger than an amount of the shaping material deposited according to the first intermediate data and specify a gap region interposed between regions where the shaping material is deposited according to the second intermediate data, and
   generate the shaping data by changing the first intermediate data or the second intermediate data such that the shaping material is deposited in the specified gap region.

* * * * *